United States Patent [19]

Parapetti

[11] Patent Number: 4,781,351
[45] Date of Patent: Nov. 1, 1988

[54] DEVICE FOR ADJUSTABLY SUPPORTING A DIAL INDICATOR

[76] Inventor: Nicholas Parapetti, 615 N. First St., Rockford, Ill. 61107

[21] Appl. No.: 34,654

[22] Filed: Apr. 6, 1987

[51] Int. Cl.⁴ ............................................. E04G 3/00
[52] U.S. Cl. .................................. 248/291; 248/284; 248/DIG. 4; 403/344; 403/362; 411/413
[58] Field of Search ............ 248/291, 293, 284, 316.8, 248/231.5, DIG. 4; 403/309, 16, 344, 362; 33/172 R, 172 B, 172 D; 411/413, 999

[56] References Cited

U.S. PATENT DOCUMENTS

| | | | |
|---|---|---|---|
| 2,602,365 | 7/1952 | Ditson | 411/999 X |
| 2,829,696 | 4/1958 | Wagner | 411/999 X |
| 3,124,408 | 3/1964 | Oestereicher | 411/999 X |
| 3,254,797 | 7/1966 | Budd | 411/413 X |
| 3,442,478 | 5/1969 | Parapetti | 248/231.7 X |
| 3,683,437 | 8/1972 | Larson | 411/413 X |
| 3,861,269 | 1/1975 | Laverty | 411/413 |
| 3,935,785 | 2/1976 | Lathom | 411/413 |
| 4,068,965 | 1/1978 | Lichti | 403/344 X |
| 4,179,976 | 12/1979 | Sygnator | 411/413 |
| 4,371,355 | 2/1983 | Baumann | 403/309 X |
| 4,411,402 | 10/1983 | Keller | 248/284 |
| 4,428,697 | 1/1984 | Ruland | 403/344 |

OTHER PUBLICATIONS

Brown & Sharpe publication entitled *New Tools–Supplement Shop Manual* (Dec. 1982), front and back cover pages and p. 21.
Publication entitled *Unigage Fall Tool Sale*, pp. 1 and 20.
Publication entitled *Flexibar*, pp. 1 and 15.

*Primary Examiner*—Ramon O. Ramirez
*Attorney, Agent, or Firm*—Leydig, Voit & Mayer, Ltd.

[57] ABSTRACT

A dial indicator is supported by a device which relies on a differential screw to enable the feeler of the dial indicator to be precisely adjusted in very fine increments. In one embodiment, the differential screw extends between the two legs of a U-shaped element, the dial indicator being carried by one of the legs and being adjusted when the screw is turned to pivot the legs toward or away from one another. In another embodiment, the screw extends between two end-to-end links and is operable when turned to effect relative pivoting of the links.

9 Claims, 2 Drawing Sheets

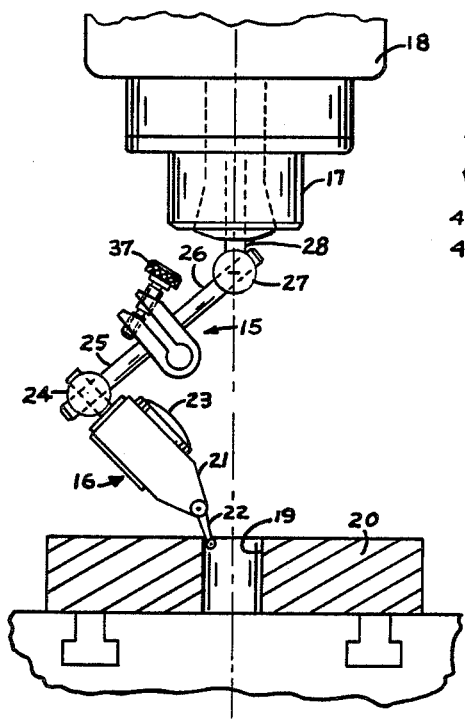
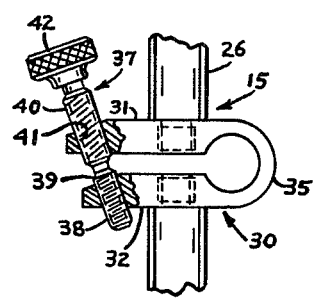
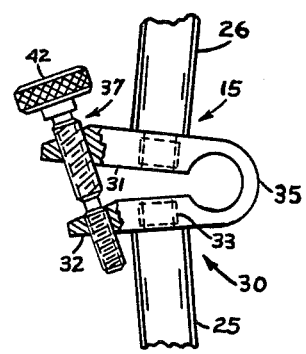
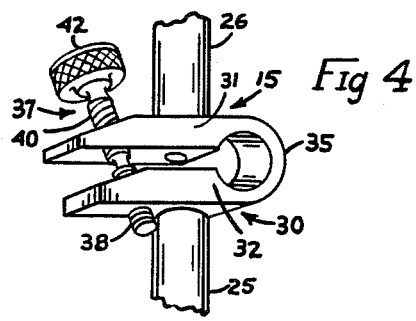
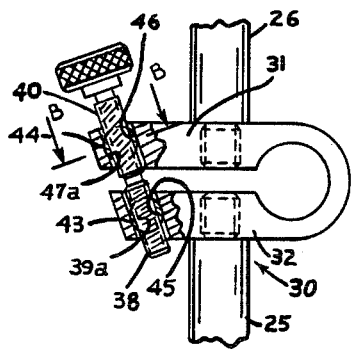
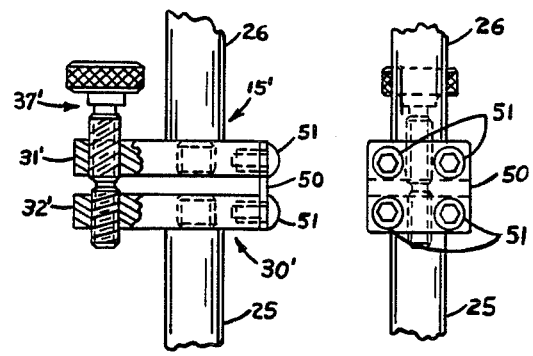
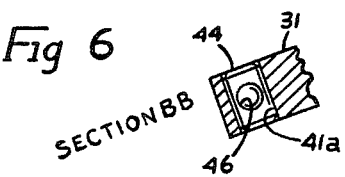

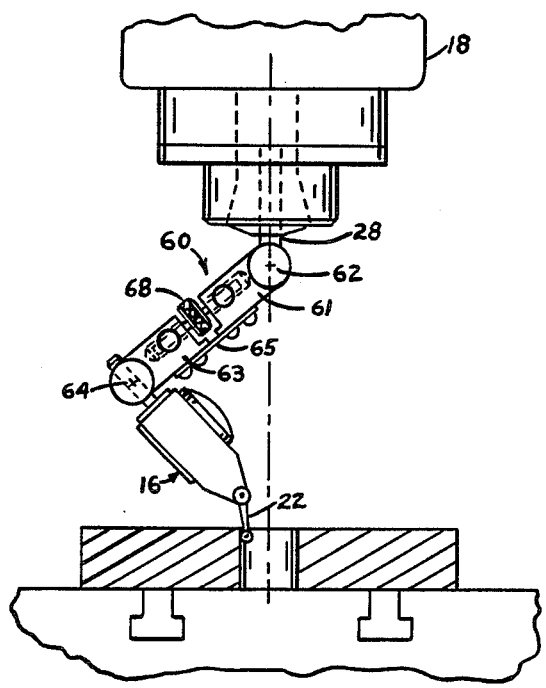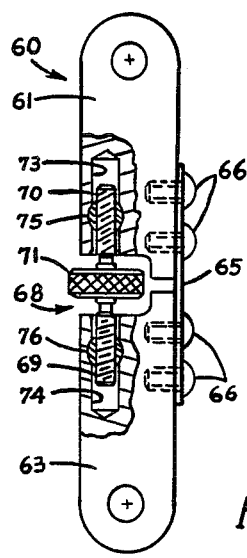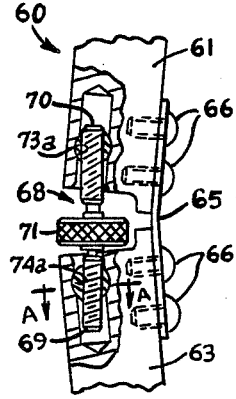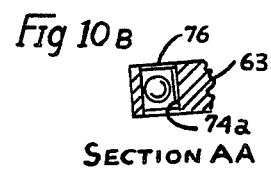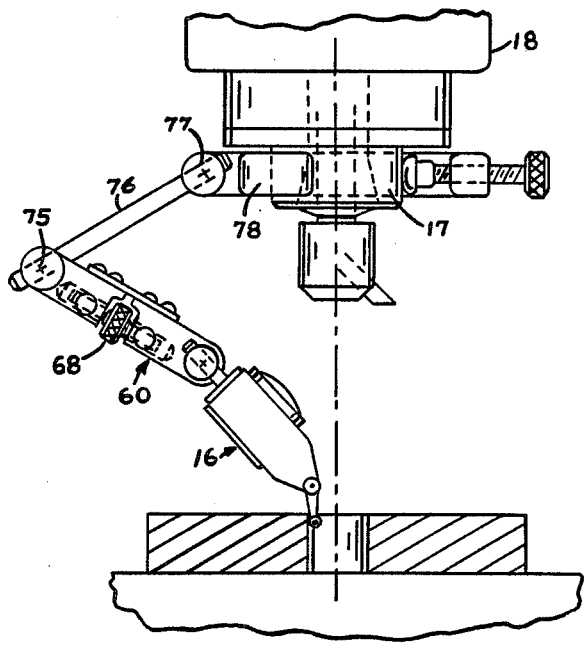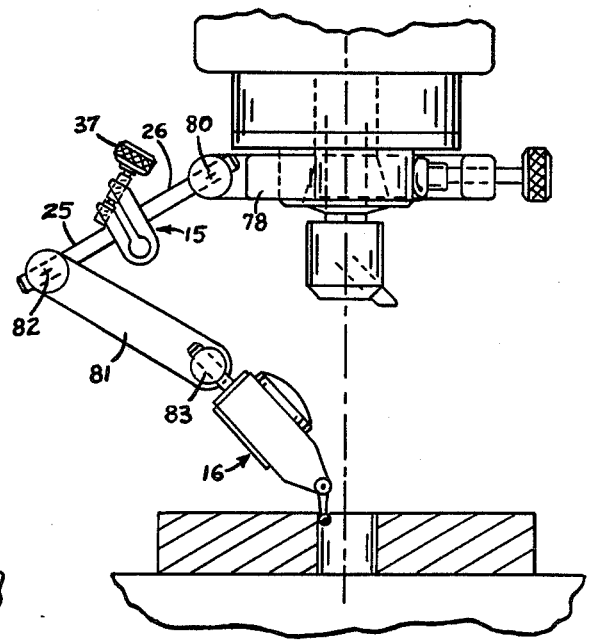

DEVICE FOR ADJUSTABLY SUPPORTING A DIAL INDICATOR

BACKGROUND OF THE INVENTION

This invention relates to a device for holding a dial indicator and for permitting adjustment of the dial indicator relative to a supporting member.

The dial indicator is a long known and widely used instrument employed by machinists for a wide variety of purposes. A dial indicator is used extensively to locate the position of workpieces in machine tools. For example, when workpieces are chucked in lathes or in boring, drilling or milling machines, it is necessary to center the workpiece accurately with respect to the spindle and cutter of the machine. Also, it is commonly necessary to locate the positions of openings, or of walls or flanges, etc. and as well as heights of various objects of machine work.

The dial indicator is a form of instrument having a graduated dial and having a hand which is connected to a contact point or feeler by a system of multiplying levers so that a very slight movement of the feeler is greatly magnified by the indicating hand. The feeler is placed in contact with the part to be tested, and variations, either in size, alignment, or concentricity, depending upon how the indicator is used, are shown by the movement of the hand relative to the dial, which is graduated to read thousandths or ten thousandths of an inch.

Such an instrument must be delicately handled to avoid damage to it and also to permit it to record accurate readings. Accordingly, the indicator must be held firmly and in a steady position relative to the work in order to avoid false deflections of the indicating hand. Its initial setting relative to the work must be made gently in order to avoid any forceful or sharp engagement of the feeler with the work. A further requirement is that the initial setting of the indicator should be effected precisely but easily so as to enable an accurate reading to be obtained while conserving valuable work time.

Prior arrangements for mounting and permitting adjustment of dial indicators either are complex, expensive or cumbersome to use or are incapable of effecting very fine and precise adjustment of the indicator in an easy manner.

SUMMARY OF THE INVENTION

The general aim of the present invention is to provide a new and improved dial indicator supporting device which, while being of very simple and inexpensive construction, is very sensitive and enables the indicator to be adjusted precisely and in fine increments.

A more detailed object of the invention is to achieve the foregoing by providing a supporting device in which the dial indicator is mounted on one link of a pair of links which are connected so as to be flexed resiliently about a pivot axis with the flexing being effected by a differential screw capable of very fine adjustment.

Still another object of the invention is to mount the differential screw in such a manner as to enable the screw to effect relative pivoting of the two links and, at the same time, to prevent the links from binding or being subjected to excessive play during such pivoting.

These and other objects and advantages of the invention will become more apparent from the following detailed description when taken in conjunction with the accompanying drawings.

BRIEF DESCRIPTION OF THE DRAWINGS

FIG. 1 is a side elevational view showing a dial indicator associatd with a typical machine tool and workpiece and illustrating one embodiment of a new and improved indicator supporting and adjusting device incorporating the unique features of the present invention.

FIG. 2 is an enlarged side elevational view of the supporting and adjusting device shown in FIG. 1, certain parts broken away and shown in section.

FIG. 3 is a view similar to FIG. 2 but, in a somewhat exaggerated manner, shows the device in an adjusted position.

FIG. 4 is a perspective view of the supporting and adjusting device shown in FIGS. 1 to 3.

FIG. 5 is a view similar to FIG. 2 but shows a modified embodiment of a supporting and adjusting device constructed in accordance with the invention.

FIG. 6 is a fragmentary cross-section taken substantially along the line B—B of FIG. 5.

FIG. 7 also is a side elevational view similar to FIG. 2 but shows still another supporting and adjusting device.

FIG. 8 is an elevational view of the device shown in FIG. 7 as seen from the right side of FIG. 7.

FIG. 9 is a view similar to FIG. 1 but shows the machine tool and the dial indicator associated with still another type of supporting and adjusting device incorporating the features of the invention.

FIG. 10 is an enlarged side elevational view of the supporting and adjusting device shown in FIG. 9, certain parts being broken away and shown in section.

FIG. 10A is a view similar to FIG. 10 but, in a somewhat exaggerated manner, shows the device in an adjusted position.

FIG. 10B is a fragmentary cross-section taken substantially along the line A—A of FIG. 10A.

FIGS. 11 and 12 are views generally similar to FIG. 1 but show different ways of installing and using the various supporting and adjusting devices.

DETAILED DESCRIPTION OF THE PREFERRED EMBODIMENTS

For purposes of illustration, the invention has been shown in the drawings as being embodied in a device 15 for supporting and permitting adjustment of a dial indicator 16. In this particular instance, the indicator has been shown as being associated with a supporting device such as the rotatable chuck 17 of a machine tool 18 and has been shown as being used for checking the concentricity of a hole 19 which the tool has formed in a workpiece 20. Those familiar with the art will appreciate that the dial indicator 16 may be supported by structure other than the chuck of the machine tool and that the indicator may be used for various checking operations.

The dial indicator 16 itself is of conventional construction and includes a body 21 which supports both a contact-point or feeler 22 and a dial 23. The feeler 22 is adapted to be traversed around the hole 19 and, upon being displaced, effects movement of an indicating hand (not shown) associated with the dial 23. The indicator is very sensitive and is capable of detecting dimensional variations as small as one ten thousandths of an inch.

The dial indicator 16 is pivotally connected at 24 to the lower end of a support member or rod 25 which is connected to a second support member or rod 26. The upper end of the rod 26 is pivotally connected at 27 to a shank 28 adapted to be gripped by the machine tool chuck 17. By loosening the pivots 24 and 27, the dial indicator may be moved so as to locate the feeler 22 in an approximate position for gaging the workpiece 20.

In accordance with the present invention, a supporting and adjusting device 15 is provided for enabling the feeler 22 to be brought into engagement with the workpiece 20 with great precision and with a high degree of sensitivity. As a result of the high sensitivity provided by the device 15, the initial setting of the dial indicator 16 may be precisely established.

More specifically, the device 15 herein serves to connect the rods 25 and 26 pivotally to one another. For this purpose, the device includes a generally U-shaped element 30 made of a piece of spring steel or other resiliently yieldable material. The U-shaped element 30 is formed with upper and lower links or legs 31 and 32 which are connected to the upper and lower rods 26 and 25, respectively. While the legs may be connected to the rods in any suitable manner, adjacent end portions of the rods preferably are reduced in diameter, are threaded as indicated at 33 in FIG. 3 and are screwed into tapped holes in the legs.

Formed integrally with and extending between the legs 31 and 32 is an arcuate bridge 35 whose thickness is less than the thickness of the legs. The bridge 35 defines a resilient pivot or hinge enabling the legs 31 and 32 to swing toward and away from one another. If the legs are spread from the position shown in FIG. 2 toward the position shown in FIG. 3, the resilient bridge 35 tends to urge the legs toward one another. Conversely, the bridge biases the legs away from one another if the legs are forced toward each other from the position shown in FIG. 2.

In carrying out the invention, an actuator in the form of a differential screw 37 is provided in order to adjust the leg 31 toward or away from the leg 32 and thereby cause the rod 26 to pivot relative to the rod 25 and establish the initial position of the feeler 22 of the dial indicator 16. As shown most clearly in FIG. 2, the lower end portion of the shank of the screw 37 is formed with a relatively fine threaded portion 38 which is threadably received in a tapped hole 39 in the free end portion of the lower leg 32. The upper end portion of the screw is formed with a coarse threaded portion 40 of the same hand but of greater pitch than the lower threaded portion 38. A tapped hole 41 in the free end portion of the upper leg 31 threadably receives the upper threaded portion 40 of the screw. Attached to the extreme upper end of the screw is a knurled knob 42 which may be used to turn the screw.

In one specific version of the device 15, the thread of the lower portion 38 of the screw 37 has a pitch of 0.0208" while the thread of the upper portion 40 has a pitch of 0.0250". When the screw is turned through a full revolution, the screw moves the lower leg 32 through a linear distance of only 0.0042" relative to the upper leg 31. As a result, the angle between the two rods 25 and 26 changes only slightly for each revolution of the screw and thus a very fine and sensitive adjustment of the feeler 22 may be effected.

FIG. 3 shows, in an exaggerated manner, the rod 25 pivoted relative to the rod 26. To enable the screw 37 to accommodate relative pivoting of the rods, there is some looseness between the threaded portions 38 and 40 and the holes 39 and 41, respectively.

The embodiment of the invention shown in FIGS. 5 and 6 eliminates such looseness. For this purpose, cylindrical bushings 43 and 44 are rotatably journaled in cylindrical holes 39a and 41a respectively, formed in the arms 32 and 31. The bushings 43 and 44 are respectively formed with tapped holes 45 and 46 which receive the threaded portions 38 and 40, respectively of the screw 37. The axes of the bushings are parallel to the pivot axis of the arms and are perpendicular to the axis of the screw. When the screw is adjusted, the bushings 43 and 44 turn in the holes 39a and 41a to allow the arms 32 and 31 to pivot relative to the screw while keeping the threads in close and precise mating engagement.

Another modified version of the invention is shown in FIGS. 7 and 8 in which parts corresponding to those of the first embodiment are indicated by the same but primed reference numerals. In the device 15', the upper and lower links or legs 31' and 32' of the U-shaped element 30' are formed as separate rigid bars rather than being integral with one another. The ends of the bars opposite the screw 37' are connected pivotally by a flat strip 50 of spring steel which is secured to the two bars by screws 51. When the differential screw 37' is adjusted, the resilient strip 50 flexes and defines a pivot permitting the leg 31' to move toward or away from the leg 32' and thereby effect fine adjustment of the dial indicator 16.

Still another embodiment of the invention is shown in FIG. 9 and FIGS. 10, 10A and 10B. The supporting and adjusting device of this embodiment has been indicated generally by the reference number 60 and includes a straight upper bar or link 61 whose upper end is connected directly to the shank 28 by a pivot 62. The upper end of a lower bar or link 63 is disposed in spaced end-to-end relation with the lower end of the upper link 61 while the lower end of the link 63 is connected directly to the dial indicator 16 by a pivot 64.

Extending across the space between the upper and lower links 61 and 63 is a flat strip 65 of spring steel which is secured to the two links by screws 66. The strip 65 defines a resilient pivot axis which permits relative pivoting of the links as shown in an exaggerated manner in FIG. 10A.

The supporting and adjusting device 60 includes a differential screw 68 with a lower threaded portion 69 having a fine thread, an upper threaded portion 70 having a coarse thread, and an intermediate adjusting knob 71 located between the two threaded portions. The upper and lower threaded portions of the screw extend into bores 73 and 74 in the links 61 and 63 while the adjusting knob 71 is located between adjacent ends of the two links.

To permit the links 61 and 63 to pivot relative to the screw 68, cylindrical bushings 75 and 76 are rotatably supported in the bores 73a and 74a and are formed with tapped holes which receive threaded portions 70 and 69 of the screw 68. As before, turning of the screw effects pivoting of the links 61 and 63 through a very small angle per increment of turning thereby to effect fine and senstive adjustment of the position of the feeler 22 of the dial indicator 16. As the links pivot, the bushings 75 and 76 turn in the bores 73a and 74a to accommodate pivoting of the links relative to the screw.

FIGS. 11 and 12 show alternative ways in which the supporting and adjusting devices of the invention may be mounted. In FIG. 11, the dial indicator 16 is shown as being connected to the lower end of the device 60 the same as in FIG. 9 but the upper end of the device 60 is connected by a pivot 75 to the lower end of a straight rod 76. The upper end of the rod, in turn, is connected by a pivot 77 to a clamp 78 which is secured to the chuck 17 of the machine tool 18 in the manner disclosed in detail in my U.S. Pat. No. 3,442,478. By virtue of the adjusting device 60 being connected pivotally to the rod 76, the dial indicator 16 may be pivoted to a wide variety of positions and yet still be adjusted finely and in a sensitive manner by the differential screw 68.

In FIG. 12, the adjusting device 15 is shown with the upper rod 26 connected to the clamp 78 by a pivot 80 and with the lower rod 25 connected to a straight and solid link 81 by a pivot 82. The dial indicator 16 is connected to the lower end of the link 81 by a pivot 83 and, as before, may be swung through a wide range of positions. Turning of the screw 37 effects fine adjustment of the dial indicator 16 after the latter has been located in an approximate position.

Those familiar with the art will appreciate that still other mounting arrangements could be employed. For example, the device 60 of FIG. 11 could be located between the pivots 80 and 82 of FIG. 12 while the device 15 and the rods 25 and 26 could take the place of the device 60 of FIG. 11.

I claim:

1. A device for holding a dial indicator and for permitting adjustment of the dial indicator relative to a supporting member, said device comprising first and second links adapted to be connected to the dial indicator and the supporting member, respectively, said first and second links being formed with first and second holes, respectively, resiliently yieldable leaf spring means connecting said first link to said second link and permitting said first link to pivot relative to said second link, and actuator means for effecting pivoting of said first link relative to said second link about a predetermined pivot axis, said actuator means comprising a differential screw having first and second threaded end portions of the same hand but of different pitch, and said first and second threaded portions extending into said first and second holes, respectively, and being threadably connected to said first and second links, respectively, whereby turning of said screw through one revolution effects pivoting of said first link relative to said second link through a distance which is a function of the difference in the pitch of said first and second threaded portions thereby to produce fine adjustment of the dial indicator relative to the supporting member.

2. A device as defined in claim 1 further including first and second internally threaded bushings supported within said first and second holes, respectively, and receiving said first and second threaded portions, respectively, of said screw, said bushings being supported within the respective holes to turn about axes extending substantially parallel to said pivot axis and substantially perpendicular to the axis of said screw.

3. A device as defined in claim 1 in which said first and second links and said resiliently yieldable spring means are integral with one another, said links defining the legs of a U and said spring means defining the bridge of the U.

4. A device as defined in claim 3 in which said screw is threadably supported by the free end portions of said links.

5. A device as defined in claim 1 in which said links are located in spaced end-to-end relation, said spring means comprising a resiliently yieldable strip extending across the space between said links and having first and second end portions connected rigidly to said first and second links, respectively.

6. A device for holding a dial indicator and for permitting adjustment of the dial indicator relative to a supporting member, said device comprising a generally U-shaped element made of resiliently yieldable material, said U-shaped element having first and second spaced legs and having a bridge integral with and extending between said legs and supporting said legs to pivot toward and away from one another about a predetermined pivot axis, said first and second legs being formed with first and second holes, respectively, actuator means for effecting pivoting of one of said legs toward and away from the other of said legs, said actuator means comprising a differential screw having first and second threaded end portions of the same hand but of different pitch, and said first and second threaded portions extending into said first and second holes, respectively, and being threadably connected to said first and second legs, respectively, whereby turning of said screw through one revolution effects pivoting of said one leg relative to said other leg through a distance which is a function of the difference in the pitch of said first and second threaded portions thereby to produce fine adjustment of the dial indicator relative to the supporting member.

7. A device as defined in claim 6 further including first and second internally threaded bushings supported within said first and second holes, respectively, and receiving said first and second threaded portions, respectively, of said screw, said bushings being supported within the respective holes to turn about axes extending substantially parallel to said pivot axis and substantially perpendicular to the axis of said screw.

8. A device for holding a dial indicator and for permitting adjustment of the dial indicator relative to a supporting member, said device comprising first and second links adapted to be connected rigidly to the dial indicator and the supporting member, respectively, said links being disposed in spaced end-to-end relation, a resiliently yieldable strip extending across the space between said links and having first and second end portions connected to said first and second links, respectively, said strip supporting said first link to pivot relative to said second link about a predetermined pivot axis, said first and second links being formed with first and second holes, respectively, and actuator means for effecting pivoting of said first link relative to said second link, said actuator means comprising a differential screw having first and second threaded end portions of the same hand but of different pitch, and said first and second threaded portions extending into said first and second holes, respectively, and being threadably connected to said first and second links, respectively, whereby turning of said screw through one revolution effects pivoting of said first link relative to said second link through a distance which is a function of the difference in the pitch of said first and second threaded portions thereby to produce fine adjustment of the dial indicator relative to the supporting member.

9. A device as defined in claim 8 further including first and second internally threaded bushings supported within said first and second holes, respectively, and receiving said first and second threaded portions, respectively, of said screw, said bushings being supported within the respective holes to turn about axes extending substantially parallel to said pivot axis and substantially perpendicular to the axis of said screw.

* * * * *